United States Patent
Borkholder

(10) Patent No.: US 12,221,302 B2
(45) Date of Patent: Feb. 11, 2025

(54) REVERSIBLE RAMP

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 707 days.

(21) Appl. No.: 17/527,221

(22) Filed: Nov. 16, 2021

(65) Prior Publication Data

US 2023/0150781 A1 May 18, 2023

(51) Int. Cl.
*B65G 69/30* (2006.01)
*B60P 1/43* (2006.01)

(52) U.S. Cl.
CPC ............. *B65G 69/30* (2013.01); *B60P 1/43* (2013.01)

(58) Field of Classification Search
CPC .................................. B65G 69/30; B60P 1/43
See application file for complete search history.

(56) References Cited

U.S. PATENT DOCUMENTS

| | | | | |
|---|---|---|---|---|
| 3,984,891 A * | 10/1976 | Weinmann | ............ | B65G 69/30 14/69.5 |
| 5,815,870 A | 10/1998 | Deutch | | |
| 6,389,629 B1 * | 5/2002 | Schouest | ................... | B60P 1/43 16/269 |
| 7,179,042 B1 * | 2/2007 | Hartmann | ............. | B65G 69/30 414/537 |
| 7,299,517 B1 * | 11/2007 | Adinolfe | ................ | B65G 69/30 193/38 |
| 7,310,843 B1 * | 12/2007 | Mitchell | ............. | B65D 88/542 14/69.5 |
| 8,914,932 B2 | 12/2014 | Romanak et al. | | |
| 2004/0111814 A1 * | 6/2004 | Allen | ..................... | B65G 69/30 14/69.5 |
| 2004/0253085 A1 * | 12/2004 | Smith, Jr. | ................. | B60P 3/07 414/469 |
| 2007/0237615 A1 * | 10/2007 | Bailie | ....................... | B60P 1/43 414/467 |
| 2009/0016865 A1 * | 1/2009 | Astor | ................... | B65G 69/287 14/71.7 |
| 2013/0091639 A1 * | 4/2013 | Romanak | ............... | B65G 69/30 14/71.1 |
| 2014/0196225 A1 * | 7/2014 | Bunker, II | ............. | F16B 45/00 14/77.1 |
| 2014/0230167 A1 * | 8/2014 | Romanak | ............... | B65G 69/30 14/69.5 |

(Continued)

*Primary Examiner* — Abigail A Risic
(74) *Attorney, Agent, or Firm* — Sanders Pianowski LLP

(57) ABSTRACT

A reversible ramp adapted for use with a trailer or truck that has an elongate rigid structure with a hook on one end for a trailer and a lip on the opposite end for a truck. The lip has a curved portion that protrudes beyond the elongate rigid structure and terminates at an edge with a lip plane extending from the edge to a corner of the elongate rigid structure. The hook terminates at an edge with a hook plane extending from the edge to a corner on the other end of the elongate rigid structure. The hook plane is at a larger angle with respect to the elongate rigid structure compared to the lip plane. In use, the hook plane aligns with the ground when the lip end is on the truck. Likewise, the lip plane aligns with the ground when the hook end is on a trailer.

17 Claims, 6 Drawing Sheets

(56) References Cited

U.S. PATENT DOCUMENTS

| | | | |
|---|---|---|---|
| 2015/0013081 A1* | 1/2015 | Breeden, III | B65G 69/30 |
| | | | 14/69.5 |
| 2015/0074924 A1* | 3/2015 | Bernart | B65G 69/30 |
| | | | 14/69.5 |
| 2017/0088372 A1* | 3/2017 | Breeden, III | B65G 69/30 |
| 2018/0118477 A1* | 5/2018 | Deshpande | B65G 69/30 |
| 2018/0178703 A1* | 6/2018 | Keck | B60P 1/43 |
| 2018/0229951 A1* | 8/2018 | Krolski | B65G 69/30 |
| 2019/0383022 A1* | 12/2019 | Winter | E04F 19/061 |
| 2021/0339968 A1* | 11/2021 | Krolski | B65G 69/287 |
| 2022/0017314 A1* | 1/2022 | Krolski | B65G 69/30 |
| 2022/0017315 A1* | 1/2022 | Krolski | B65G 69/30 |

\* cited by examiner

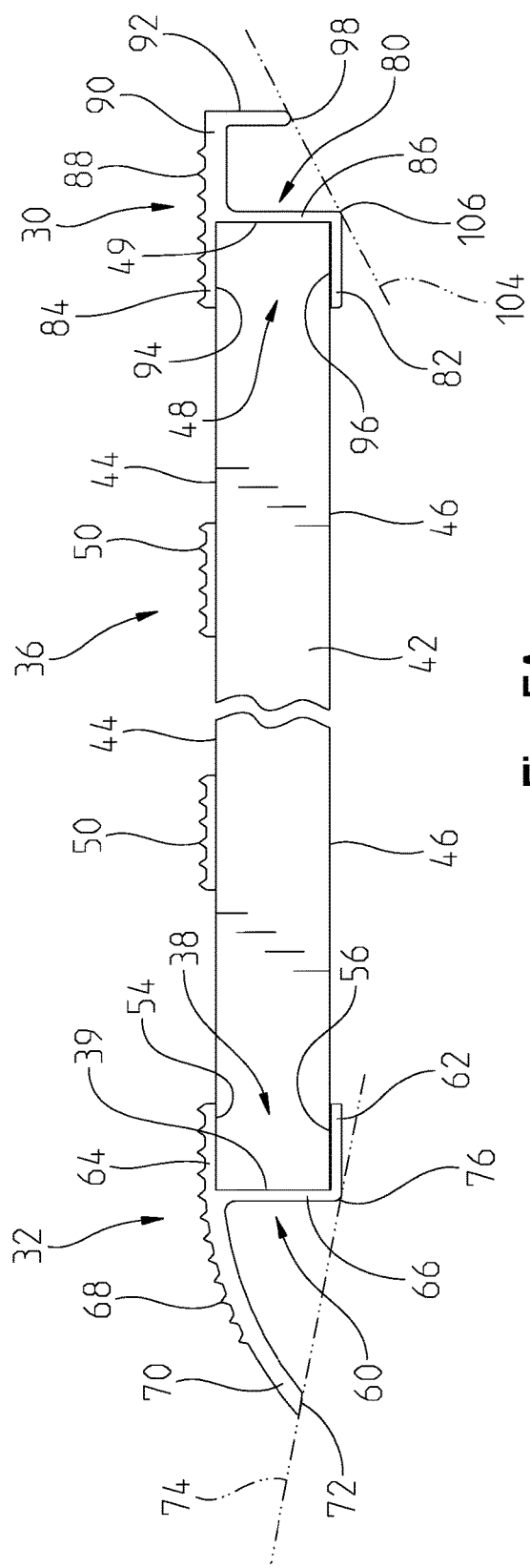
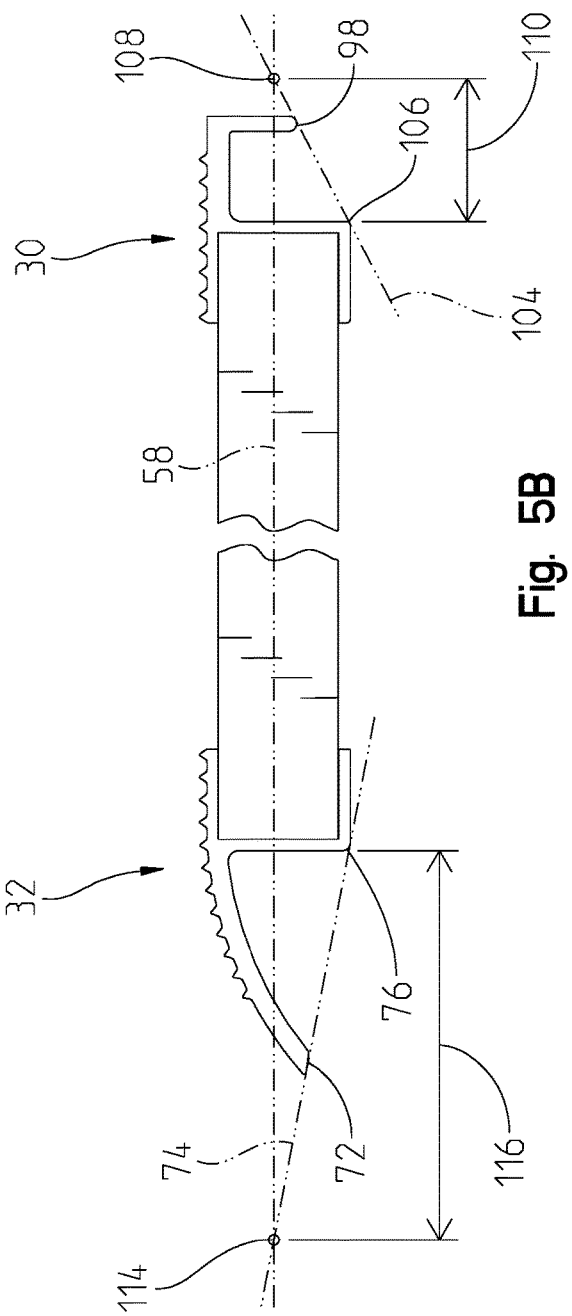
Fig. 5A
Fig. 5B

REVERSIBLE RAMP

BACKGROUND OF THE INVENTION

The present disclosure relates to ramps used to load and unload cargo from a vehicle or trailer. Ramps have been around for many years, with a wide variety of designs implemented. Many of the patents found in this area involve innovative ways to collapse and store the ramps when not in use, with others involving integration into a vehicle or trailer. Many of the mechanisms that are used to store a ramp or integrate it into a vehicle involve some level of compromise. As an example, folding and collapsing ramps can involve complex mechanisms that can add weight, increase the possibility of failure, and/or reduce weight capacity. Integrated ramps can lack portability or be tailored to a specific use, rendering it useless for other tasks. Some users use a trailer for some towing while using a standard pickup truck. Trailers frequently have an integral "C" channel affixed to the rear edge for use with ramps, while a pickup truck lacks a channel. Using a ramp designed to fit into a "C" channel on a vehicle that lacks one could result in the ramp becoming disconnected during use. An improved and all-inclusive device is needed.

SUMMARY OF THE INVENTION

The present disclosure describes a reversible ramp that works equally well with ledges (such as pickup truck beds and tailgates) and a channel (such as what is on the edge of a trailer). While other ramps would have one end that is always resting on the vehicle or trailer and the other end always resting on the ground, the present invention uses one end to attach to trailers and the opposite end to attach to higher surfaces, such as pickup truck beds. One of the problems to be solved is to not damage the lip or truck end of the ramp that is on the ground when using the ramp for trailer loading. The converse is also true. In normal operation, the user should not damage the end of the ramp that is on the ground when using the ramp. Other ramps have one end designed to rest on the ground without any contemplation of features necessary for any other purpose. By understanding the relative heights of trucks and trailers and forming constructive planes at different angles for each end, an improved ramp can be used for both purposes.

The improved ramp has a hook on one end and a lip on the opposite end with a rigid structure affixed between the ends. The lip end has a receiving channel portion formed from a bottom wall connected to a top wall portion by a spanning wall. The bottom wall has a lower tube surface and the top wall portion has an upper tube surface facing the lower tube surface. The top wall portion has a textured surface on the opposite side of the upper tube surface to assist with grip and traction. The textured surface extends from the top wall portion to an arcuate portion. The arcuate portion terminates at an end surface. The lip end has a corner where the bottom wall meets the spanning wall. A lip plane intersects the end surface and the corner, which is obliquely angled with respect to the upper and lower tube surfaces.

The hook end has a receiving channel portion formed from a bottom wall connected to a top wall portion by a spanning wall. The bottom wall has a lower tube surface and the top wall portion has an upper tube surface facing the lower tube surface. Similar to the lip end, the top wall portion has a textured surface opposite the upper tube surface that extends from the top wall portion to an overhanging wall. The overhanging wall terminates at a hook wall that is orthogonally angled with respect to the overhanging wall. The hook wall terminates at a terminal edge. The hook end has a corner where the bottom wall meets the spanning wall. A hook plane intersects the terminal edge and the corner, which is obliquely angled with respect to the upper and lower tube surface.

As previously described, the hook and lip ends are affixed to an elongate rigid structure, which can be formed from a first tube affixed to a second tube. As shown herein, the first and second tubes have a top surface parallel to a bottom surface. The top surfaces have at least one tread affixed thereto to assist with grip and traction. The elongate rigid structure has a ramp plane parallel to and located between the top and bottom surfaces. The lip plane intersects the ramp plane at a first distance from the spanning wall of the lip end while the hook plane intersects the ramp plane at a second distance from the spanning wall of the hook end. Because of the different angles of the lip plane and hook plane, the first distance is greater than the second distance. To affix the ends, the receiving channel portion of the lip end is affixed to a first end of the elongate rigid structure with the upper tube surface of the lip end overlaying a portion of the top surfaces and the lower tube surface of the lip end overlaying a portion of the bottom surfaces. Similarly, the receiving channel portion of the hook end is affixed to a second end of the elongate rigid structure with the upper tube surface overlaying a portion of the top surfaces and the lower tube surface overlaying a portion of the bottom surfaces.

BRIEF DESCRIPTION OF THE DRAWINGS

FIG. 5A is a side view with a section of the middle removed to show the ends in greater detail;

FIG. 5B is a side view of the device in FIG. 5A showing intersecting planes;

DESCRIPTION OF THE PREFERRED EMBODIMENT

Figure 1:
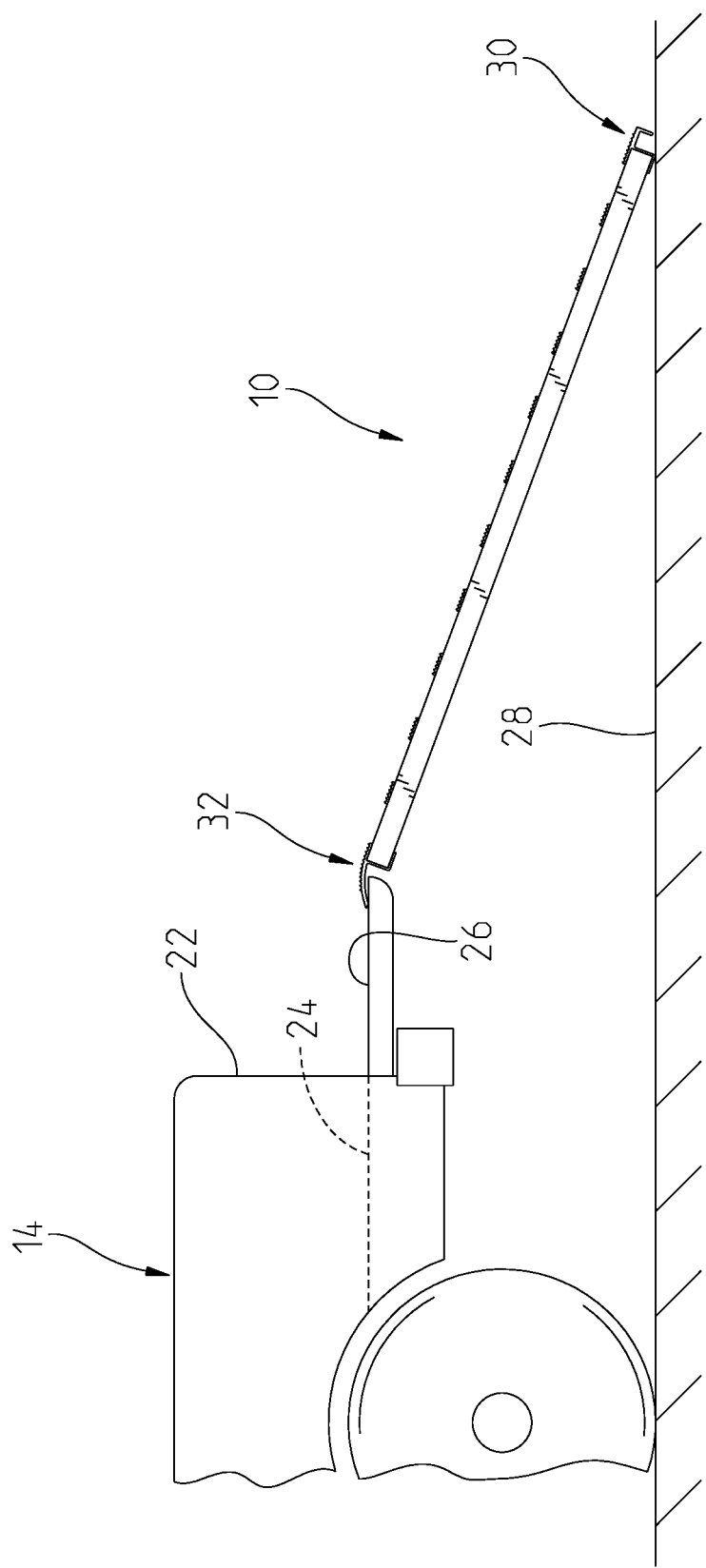
FIG. 1 is a side view of a reversible ramp being used in conjunction with a pickup truck.
Figure 2:
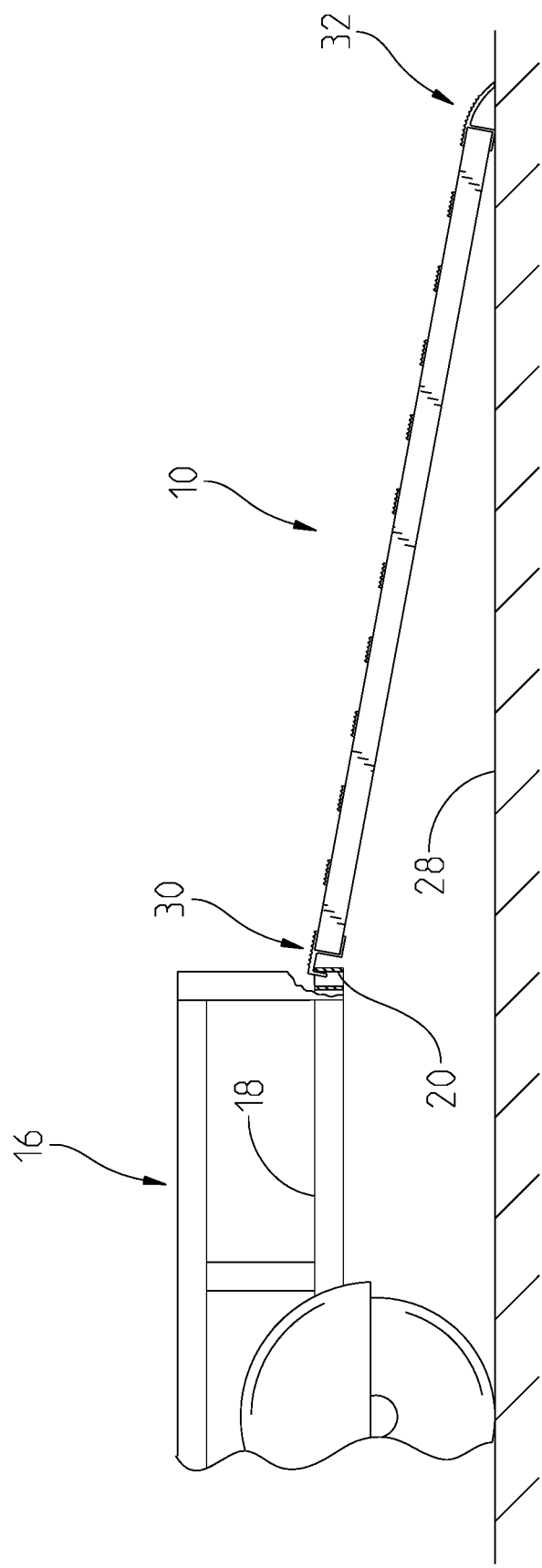
FIG. 2 is a side view of the reversible ramp in FIG. 1 being used with a trailer.
Figure 3:
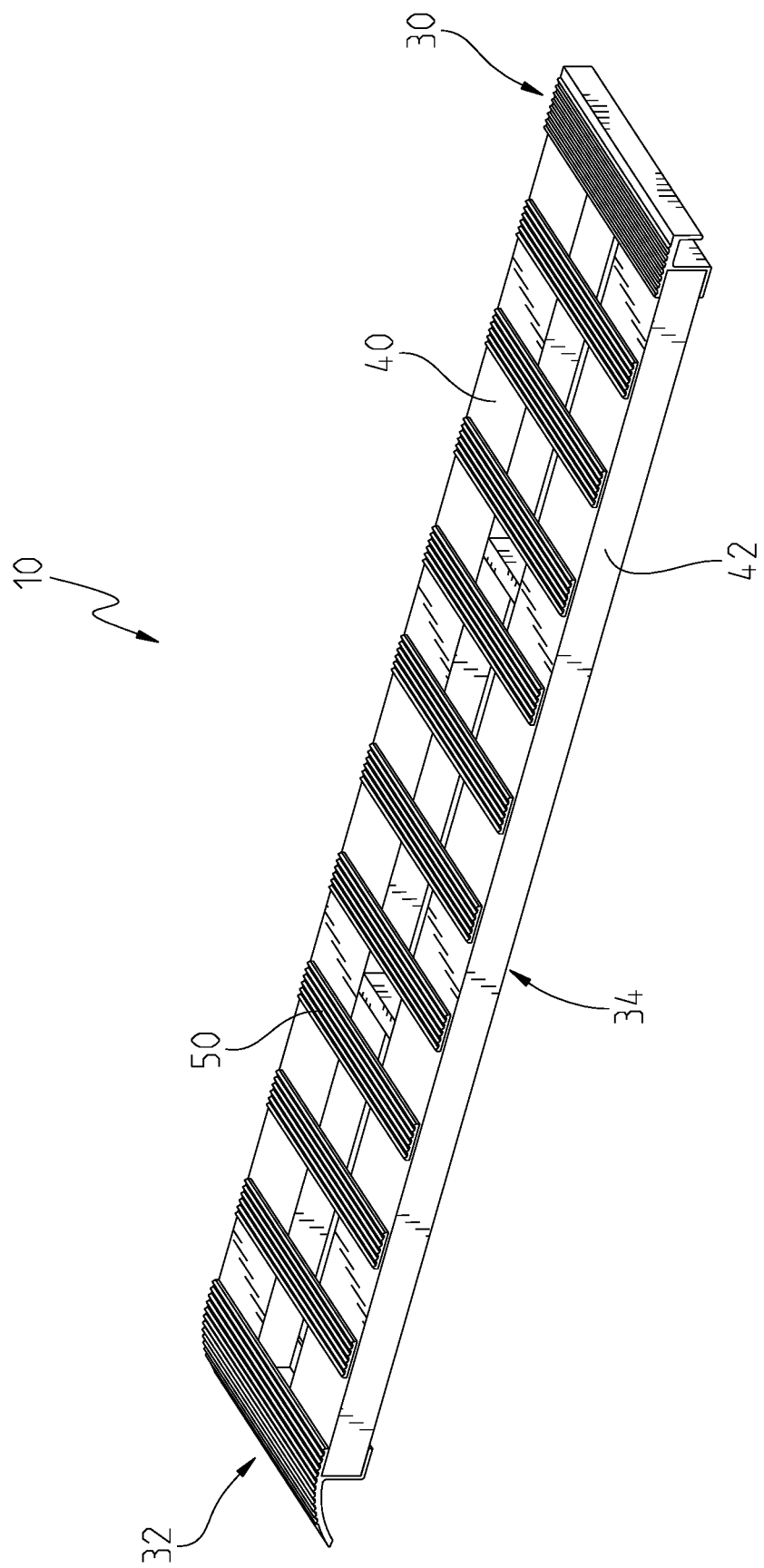
FIG. 3 is an isometric view of the reversible ramp.
Figure 4:
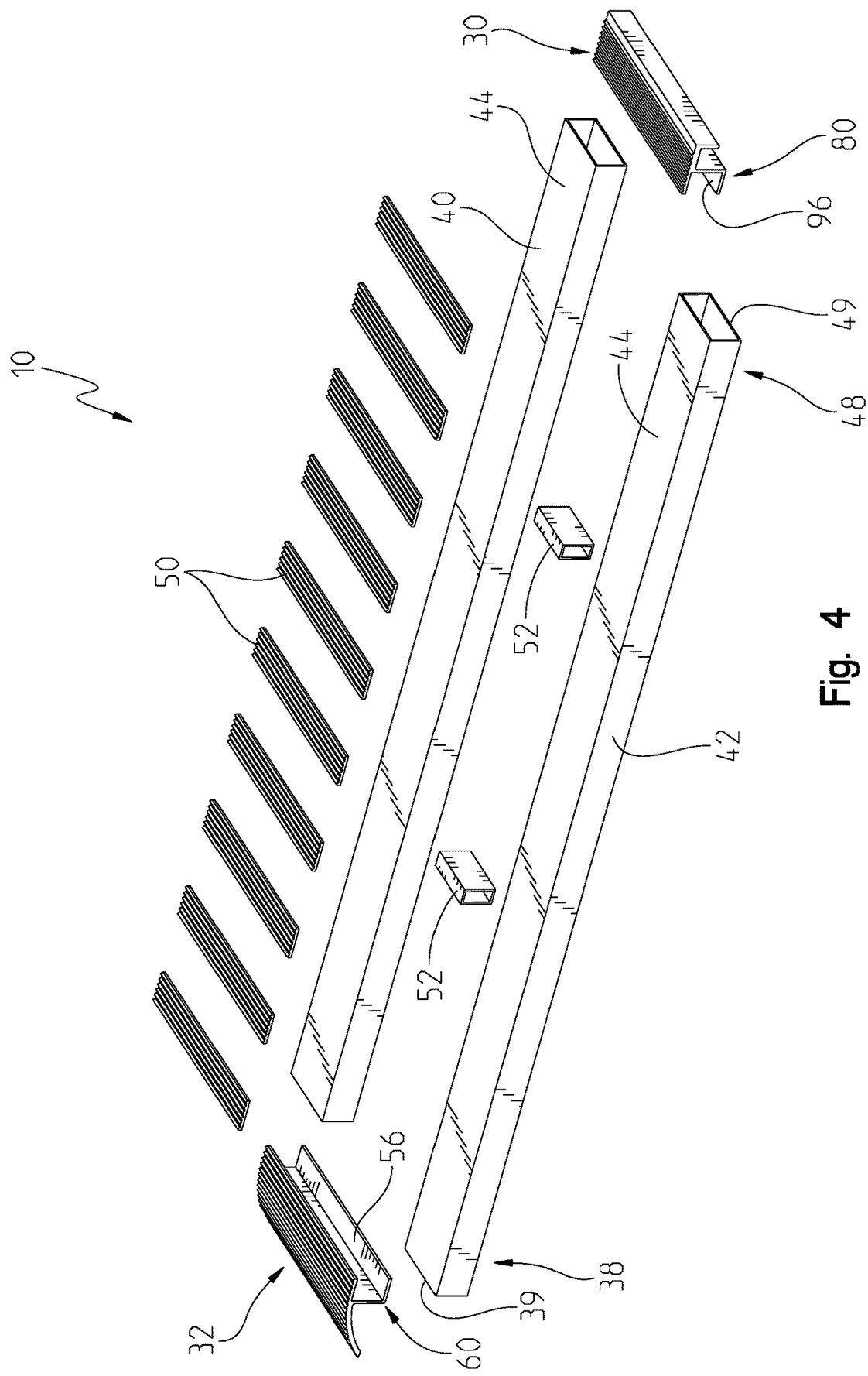
FIG. 4 is an exploded isometric view of the reversible ramp in FIG. 3.
Figure 6:
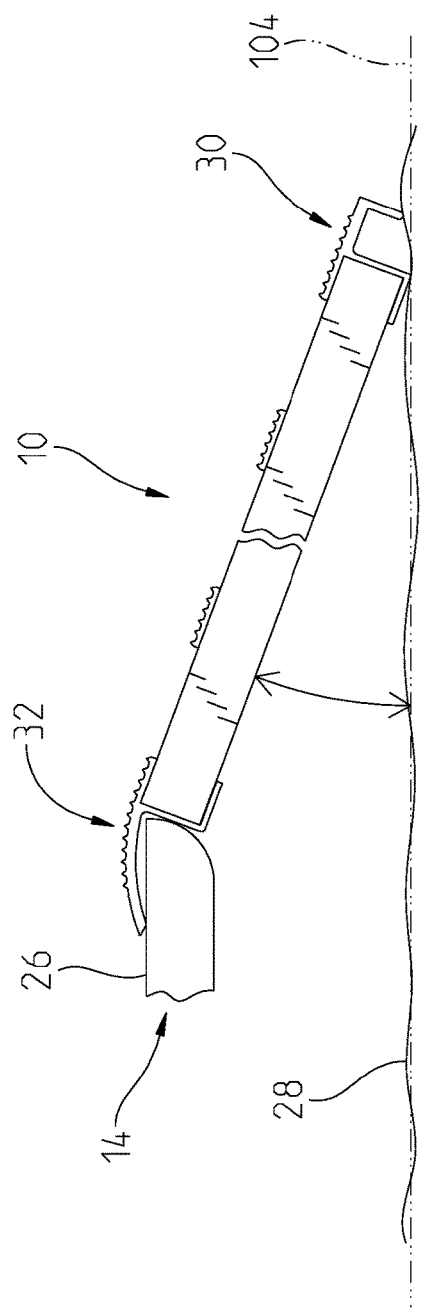
FIG. 6 is a partial view of the reversible ramp in FIG. 1 showing the angle of the ramp in use with a truck.
Figure 7:
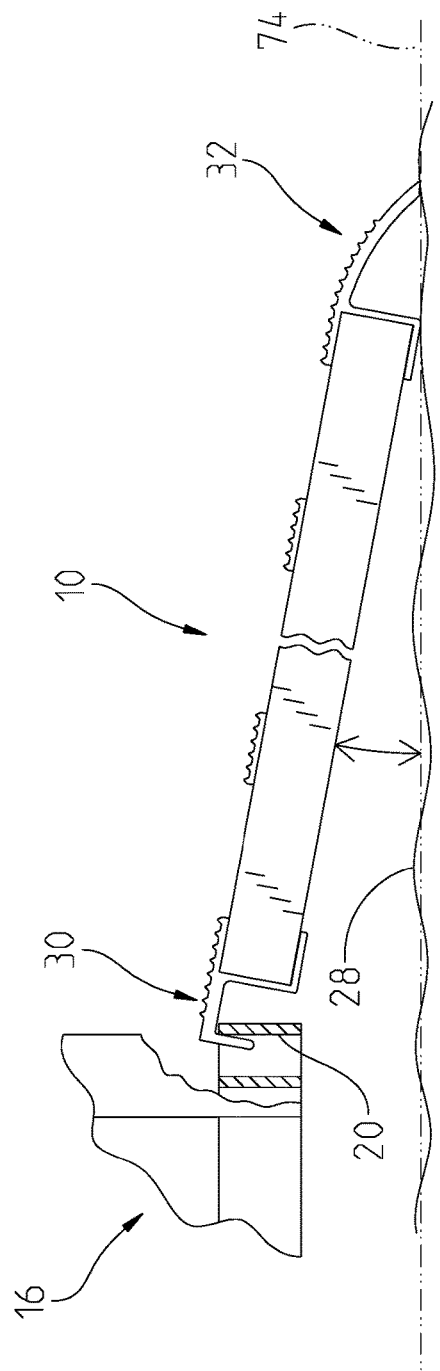
FIG. 7 is a partial view of the reversible ramp in FIG. 2 showing the angle of the ramp in use with a trailer.

A reversible ramp 10 is shown in FIGS. 1-7 and is designed to work equally well with a truck 14 as shown in FIGS. 1 and 6 or trailer 16 as shown in FIGS. 2 and 7. The trailer 16 has a deck surface 18 and a channel 20 affixed at the edge, shown in FIG. 2. The channel 20 is commonly a "C" channel welded to the trailer frame and is designed to be used to hang ramps, shown in further detail in FIG. 7. The channel 20 is commonly slightly lower than the deck surface 18 to provide a smooth transition from the ramp to the deck, but the channel 20 could be located at other positions. The truck 14 has a bed 22 with a bed surface 24. A tailgate 26 is movable between a down position as shown in FIG. 1 and an up position (not shown).

The reversible ramp 10 is an elongate structural device with a hook end 30 and a lip end 32. The ends 30, 32 are affixed to terminal ends of an elongate rigid structure 34. The elongate rigid structure 34 has a tread side 36 which is formed from a series of individual components that are affixed together, typically through welding. The elongate rigid structure 34 has a first end 38 with a first terminal end 39 and a second end 48 with a second terminal end 49 opposite the first terminal end. Hollow rectangular tubes 40, 42 are the main structural component. In the embodiment shown herein, the tubes 40, 42 are an extrusion with a consistent cross-section profile along their length, but other methods of manufacturing are contemplated, such as forming, welding, or casting. It is further contemplated that the tubes 40, 42 are a non-tubular component, such as an I-beam, C-channel, or other shape that can carry weight between its ends. The tubes 40, 42 have several functions. First, they provide a structural element to support weight, as the ramp 10 is typically only supported at the ends 30, 32 when in use. Second, they provide a top surface 44 where treads 50 can be attached. The treads 50 are on the tread side 36 of the elongate rigid structure 34. Third, the tubes 40, 42 mate with the ends 30, 32 to allow them to be affixed. The tubes 40, 42 also have a bottom surface 46 spaced from and parallel to the top surface 44. Located between the top surface 44 and the bottom surface 46 is a ramp plane 58 which is parallel to the surfaces 44, 46. In the event that other non-tubular shapes are used, the other shapes would have a constructive top surface 44 and constructive bottom surface 46 that would interface, mate with, or be affixed to the components and features described herein. In the embodiment shown herein, the ramp plane 58 is located at a midpoint between the surfaces 44, 46. The tubes 40, 42 are tied together at the ends 30, 32 and also at supports 52. The supports 52 are affixed to the tubes 40, 42 to provide further structural reinforcement. As shown, the supports 52 are affixed between the tubes 40, 42 with welding, but other attachment methods are contemplated. The elongate rigid structure 34 has been described as rigid, but it is contemplated that a hinge or other feature is included to allow the ramp 10 to be folded or compressed for storage.

The lip end 32 has a receiving channel portion 60 having a bottom wall 62 connected to a top wall portion 64 by a spanning wall 66. The top wall portion 64 and bottom wall 62 are spaced to allow the end of the tubes 40, 42 to fit as shown in the FIGS. 4 and 5A, where they can be secured through welding or other attachment means such as bolts, rivets, or adhesive. An upper tube surface 54 on the top wall portion 64 faces a lower tube surface 56 on the bottom wall 62. The top wall portion 64 is adjacent to the top surface 44. A grooved or textured surface 68 extends from the top wall portion 64 to an arcuate portion 70. The arcuate portion 70, as shown, is thicker than the top wall portion 64 and terminates at an end surface 72 which is located at a position between the top wall portion 64 and bottom wall 62. The end surface 72 is obliquely angled with respect to the tube surfaces 54, 56. As shown, the end surface 72 is parallel to and located on a lip plane 74 that intersects a corner 76 where the bottom wall 62 meets the spanning wall 66. It is contemplated that corner 76 is where the bottom surface 46 meets the first terminal end 39.

The hook end 30 has a receiving channel portion 80 that mates to the tubes 40, 42 using a bottom wall 82 connected to a top wall portion 84 by a spanning wall 86. The top wall portion 84 and bottom wall 82 are spaced to allow the end of the tubes 40, 42 to fit as shown in the FIGS. 4 and 5A, where they can be secured through welding or other attachment means such as bolts, rivets, or adhesive. An upper tube surface 94 on the top wall portion 84 faces a lower tube surface 96 on the bottom wall 82. A grooved or textured surface 88 extends from the top wall portion 84 to an overhanging wall 90. The overhanging wall 90 is adjacent to the top surface 44 and terminates at a hook wall 92 that is perpendicular to the overhanging wall 90. The hook wall 92 has a terminal edge 98 that is located between the upper and lower tube surfaces 94, 96. A hook plane 104 connects the terminal edge 98 to a corner 106, as shown in FIG. 5B. It is contemplated that corner 106 is where the bottom surface 46 meets the second terminal end 49. As can be seen in the FIG. 5B, the end surface 72 is spaced from the spanning wall 66 by a greater distance than the terminal edge 98 is spaced from spanning wall 86. The lip plane 74 intersects the ramp plane 58 at a first intersection 114 which is spaced from the spanning wall 66 by a first distance 116. The first distance 116 could be measured from the first terminal end 39 instead of the spanning wall 66. The hook plane 104 intersects the ramp plane 58 at a second intersection 108 which is close to the terminal edge 98 and spaced from the spanning wall 86 by a second distance 110. It is contemplated that the second distance 110 is measured from the second terminal end 49 instead of spanning wall 86. The first distance 116 is greater than the second distance 110 because of the angles of the respective planes 74, 104.

As previously described, the hook end 30 and lip end 32 are affixed to the elongate rigid structure 34. The receiving channel portion 60 receives the first end 38 with the first terminal end 39 abutting the spanning wall 66. The top wall portion 64 overlays a portion of the top surface 44 while the bottom wall 62 overlays a portion of the bottom surface 46. Similarly, the receiving channel portion 80 receives the second end 48 with the second terminal end 49 abutting the spanning wall 86. The top wall portion 84 overlays a portion of the top surface 44 while the bottom wall 82 overlays a portion of the bottom surface 46.

FIGS. 1 and 2 show common uses of the reversible ramp 10, with a pickup truck 14 shown in FIGS. 1 and 6 and a trailer 16 shown in FIGS. 2 and 7. In FIGS. 6 and 7, a middle portion of the elongate rigid structure 34 is removed to show the ends 30, 32 in greater detail. Removal of this portion gives the appearance of the truck 14 and trailer 16 at a lower vertical position with respect to the ground 28 than what would occur in normal operation. Their relative difference in height and the different angles of the ramp still apply for FIGS. 6 and 7. When used with a pickup truck 14 or other vehicle without a channel 20, the hook end 30 is on the ground 28 and the lip end 32 rests on the vehicle. As assembled and shown in FIG. 5B, the ramp plane 58 is fixed with respect to the lip plane 74 and hook plane 104. The lip plane 74 represents an optimum angle for the ramp 10 to contact the ground 28 when the hook end 30 is supported by a trailer 16. The hook plane 104 represents the optimum angle for the ramp 10 to contact the ground 28 when the lip end 32 is supported by a tailgate 26 or bed surface 24. The lip plane 74 intersects the ramp plane 58 at a shallow angle compared to the angle that the hook plane 104 intersects the ramp plane 58. This is due to the typical height difference between a tailgate 26 or deck surface 18 of a trailer 16. Tailgates 26 or bed surfaces 24 are commonly much higher from the ground 28 compared to deck surfaces 18 of trailers 16.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A reversible ramp comprising:
 a lip end having a receiving channel portion formed from a bottom wall connected to a top wall portion by a spanning wall, said bottom wall having a lower tube surface and said top wall portion having an upper tube surface facing said lower tube surface, said top wall portion having a textured surface opposite said upper tube surface, said textured surface extending from said top wall portion to an arcuate portion, said arcuate portion terminating at an end surface, said lip end having a corner where said bottom wall meets said spanning wall, said end surface and said corner located on a lip plane obliquely angled with respect to said upper and lower tube surfaces;
 a hook end having a receiving channel portion formed from a bottom wall connected to a top wall portion by a spanning wall, said bottom wall having a lower tube surface and said top wall portion having an upper tube surface facing said lower tube surface, said top wall portion having a textured surface opposite said upper tube surface, said textured surface extending from said top wall portion to an overhanging wall, said overhanging wall terminating at a hook wall orthogonally angled with respect thereto, said hook wall terminating at a terminal edge, said hook end having a corner where said bottom wall meets said spanning wall, said terminal edge and said corner located on a hook plane obliquely angled with respect to said upper and lower tube surfaces;
 an elongate rigid structure formed from a first tube affixed to a second tube, each said first and second tubes having a top surface parallel to a bottom surface, said top surfaces having at least one tread affixed thereto, said elongate rigid structure having a ramp plane parallel to and located at a midpoint between said top surfaces and said bottom surfaces;
 said lip plane intersecting said ramp plane at a first distance from said spanning wall of said lip end, said hook plane intersecting said ramp plane at a second distance from said spanning wall of said hook end, said first distance greater than said second distance;
 said receiving channel portion of said lip end affixed to a first end of said elongate rigid structure with said upper tube surface of said lip end overlaying a portion of said top surfaces and said lower tube surface of said lip end overlaying a portion of said bottom surfaces; and
 said receiving channel portion of said hook end affixed to a second end of said elongate rigid structure with said upper tube surface of said hook end overlaying a portion of said top surfaces and said lower tube surface of said hook end overlaying a portion of said bottom surfaces.

2. The reversible ramp of claim 1, wherein said end surface is spaced from said spanning wall of said lip end by a distance greater than a distance between said terminal edge and said spanning wall of said hook end.

3. The reversible ramp of claim 1, wherein said end surface is parallel to said lip plane.

4. The reversible ramp of claim 1, wherein said end surface of said lip end and said terminal edge of said hook end each break said ramp plane.

5. The reversible ramp of claim 1, wherein said hook end, said lip end, and elongate structure are affixed to form a single rigid structure.

6. The reversible ramp of claim 1, wherein said ramp is foldable.

7. A reversible ramp comprising:
 a lip end having a receiving channel portion formed from a bottom wall connected to a top wall portion by a spanning wall, said bottom wall having a lower tube surface and said top wall portion having an upper tube surface facing said lower tube surface, said lip end having an arcuate portion extending therefrom in a direction opposite said receiving channel portion terminating at an end surface, said lip end having a corner where said bottom wall meets said spanning wall, said end surface and said corner located on a lip plane obliquely angled with respect to said upper tube surface;
 a hook end having a receiving channel portion formed from a bottom wall connected to a top wall portion by a spanning wall, said bottom wall having a lower tube surface and said top wall portion having an upper tube surface facing said lower tube surface, said hook end having an overhanging wall extending therefrom in a direction opposite said receiving channel portion terminating at a hook wall, said hook wall terminating at a terminal edge, said hook end having a corner where said bottom wall meets said spanning wall, said terminal edge and said corner located on a hook plane obliquely angled with respect to said upper tube surface;
 an elongate rigid structure having a top surface parallel to a bottom surface, said elongate rigid structure having a ramp plane parallel to and located between said top surfaces and said bottom surfaces;
 said lip plane intersecting said ramp plane at a first distance from said spanning wall of said lip end, said hook plane intersecting said ramp plane at a second distance from said spanning wall of said hook end, said first distance greater than said second distance;
 said receiving channel portion of said lip end affixed to a first end of said elongate rigid structure with said upper tube surface of said lip end overlaying a portion of said top surface and said lower tube surface of said lip end overlaying a portion of said bottom surface; and
 said receiving channel portion of said hook end affixed to a second end of said elongate rigid structure with said upper tube surface of said hook end overlaying a portion of said top surface and said lower tube surface of said hook end overlaying a portion of said bottom surface.

8. The reversible ramp of claim 7, said top surface of said elongate rigid structure having at least one tread affixed thereto.

9. The reversible ramp of claim 7, wherein said elongate rigid structure is formed from a first tube affixed to a second tube, said top and bottom surfaces located on said tubes.

10. The reversible ramp of claim 7, wherein said hook end, said lip end, and elongate structure form a single rigid structure.

11. The reversible ramp of claim 7, wherein said ramp is foldable.

12. A reversible ramp comprising:
 an elongate rigid structure having a lip end affixed thereto at a first end and a hook end affixed thereto at a second end opposite said first end;

said elongate rigid structure having a top surface and a bottom surface, said elongate rigid structure having a ramp plane parallel thereto;

said lip end having an arcuate portion extending beyond a first terminal end of said elongate rigid structure and terminating at an end surface;

said hook end having an overhanging wall extending beyond a second terminal end of said elongate rigid structure and terminating at a hook wall, said hook wall terminating at a terminal edge; and a lip plane intersecting said end surface of said lip end and where said bottom surface meets said first end of said elongate rigid structure, said reversible ramp having a hook plane intersecting said terminal edge of said hook end and where said bottom surface meets said second terminal end of said elongate rigid structure, said lip plane and said hook plane obliquely angled with respect to said ramp plane, said lip plane intersects said ramp plane at a first distance from said first terminal end, said hook plane intersects said ramp plane at a second distance from said second terminal end, said first distance greater than said second distance.

13. The reversible ramp of claim 12, wherein said end surface of said lip end is located at a greater distance from said first terminal end than said terminal edge is spaced from said second terminal end.

14. The reversible ramp of claim 12, wherein elongate rigid structure is formed from a first tube affixed to a second tube.

15. The reversible ramp of claim 12, wherein said lip end has a receiving channel portion, said receiving channel portion formed from a bottom wall connected to a top wall portion by a spanning wall, said bottom wall having a lower tube surface and said top wall portion having an upper tube surface facing said lower tube surface.

16. The reversible ramp of claim 12, wherein said hook end has a receiving channel portion, said receiving channel portion formed from a bottom wall connected to a top wall portion by a spanning wall, said bottom wall having a lower tube surface and said top wall portion having an upper tube surface facing said lower tube surface.

17. The reversible ramp of claim 12, wherein said ramp is foldable.

* * * * *